United States Patent [19]

Anolick

[11] 4,128,698

[45] Dec. 5, 1978

[54] ENERGY ABSORBING MECHANISM

[75] Inventor: Colin Anolick; Howard J.Kutsch, both of Wilmington, Del.

[73] Assignee: E. I. Du Pont de Nemours and Company, Wilmington, Del.

[21] Appl. No.: 837,277

[22] Filed: Sep. 27, 1977

Related U.S. Application Data

[62] Division of Ser. No. 719,952, Sep. 2, 1976, Pat. No. 4,076,226.

[51] Int. Cl.² .............................................. B32B 27/00
[52] U.S. Cl. .................................... 428/480; 428/130; 428/910
[58] Field of Search ..................................... 428/57–61, 428/121, 123, 124, 126, 127–129, 292, 294, 480, 910, 130

[56] References Cited

U.S. PATENT DOCUMENTS 3,972,768 8/1976 Hill ........................................ 428/126

Primary Examiner—William J. Van Balen

[57] ABSTRACT

An energy absorbing mechanism having an elongated member, one end of which is disposed to receive an impact and the opposite end is free for displacement under said impact. The elongated member is provided with two longitudinally spaced transverse pins and a pair of longitudinal slots within which the pin adjacent the outboard end of the elongated member is free to slide; the other transverse pin is fixed to the inboard end of the elongated member. An oriented elastomer, preferably a copolyetherester in the form of a belt, operably connects the pins so as to constitute an energy absorber upon displacement of the elongated member responsive to impact. The mechanism can be mounted on an automobile frame and the outboard end provided with a bumper.

3 Claims, 3 Drawing Figures

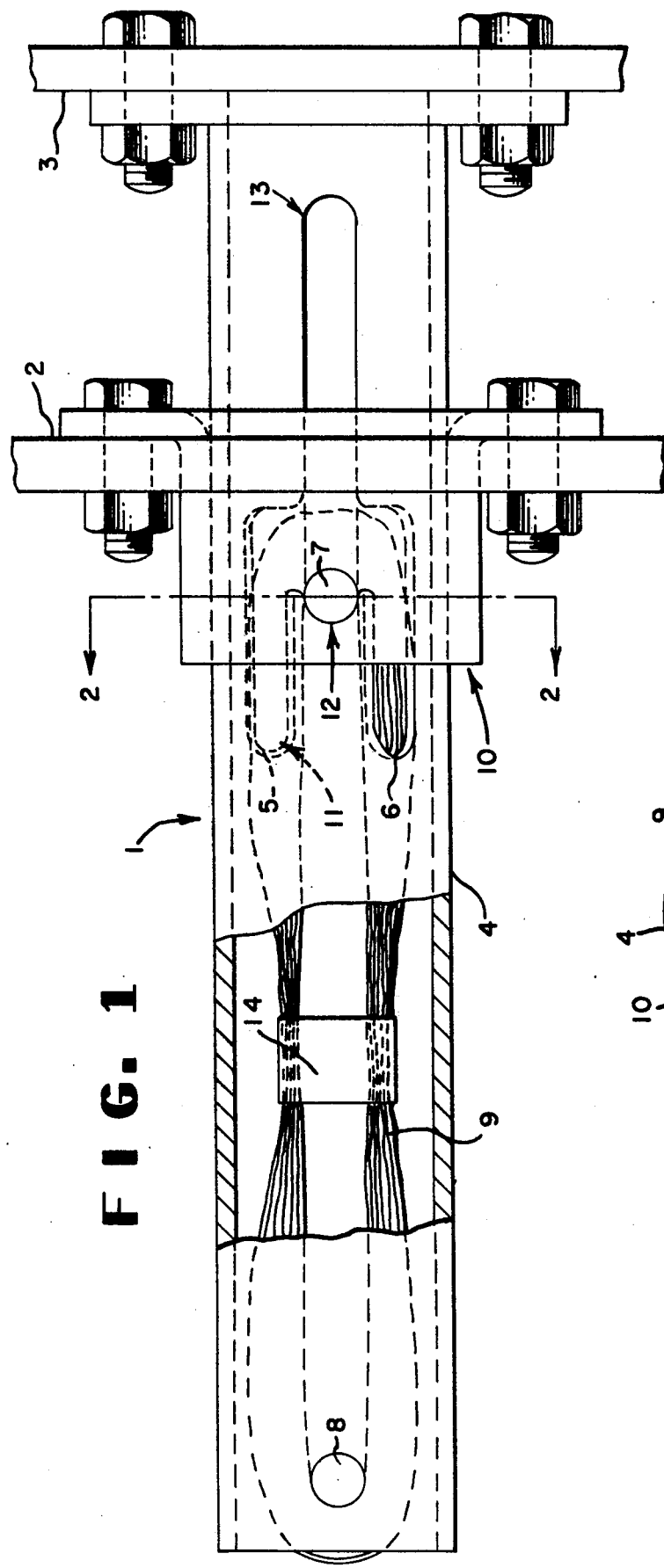
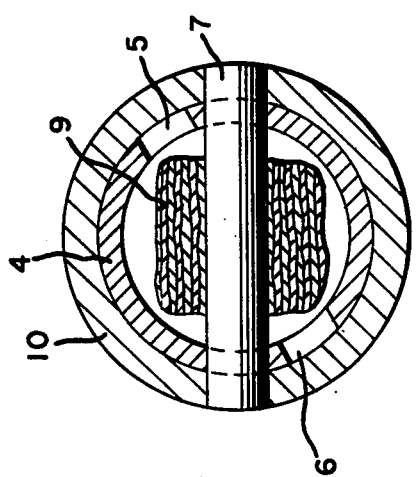

ENERGY ABSORBING MECHANISM

This is a division of application Ser. No. 719,952, filed Sept. 2, 1976, now U.S. Pat. No. 4,076,226.

BACKGROUND OF THE INVENTION

This invention is directed to an energy absorbing device and, more particularly, to one in which energy is absorbed under tensile stress and deflection.

Energy absorbing devices of various types have been used to cushion impact upon collision, especially in bumper systems for automotive vehicles. Until recently bumper systems on automotive vehicles were merely an external body component used to finish off the appearance of a vehicle. However, as a result of public demand and legislative action a more sophisticated design for bumpers is now obligatory. Much emphasis is placed on the protection of vehicles against high repair costs due to collision damage and, thus, various type of energy absorbing bumper systems have been suggested. Hydraulic shock-absorber type systems have been used most extensively. These systems operate by forcing fluid through small apertures, and use air pressure or metallic springs to provide for return of the device to its normal operating position for repeated impacts. Other energy absorbing systems employ plastic or rubber blocks, both solid and hollow, and cushion the shock by compression. Such energy absorbing devices have not been entirely satisfactory. For example, hydraulic devices are generally quite heavy and must contain a liquid. The weight of the device is an important consideration, especially today when interest in the automotive industry is making lighter weight vehicles. Systems that use plastic or rubber blocks suffer from disadvantages in restorability. Mechanical energy absorbing systems composed of metal springs are not fully satisfactory because they have a high coefficient of restitution and thus can constitute a danger due to loss of vehicle control as the vehicle is fired back from the object it has hit. Energy absorbing devices should not only be relatively light but they must be strong enough to withstand rather severe low speed impact. For example, in the impact of a 3000 pound automobile hitting a fixed object at 5 miles/hour about 30,000 inch-pounds of energy must be absorbed by the energy-absorbing device over displacement through a short distance, e.g., about two inches. Further, an energy absorbing device used in a bumper system for automotive vehicles must be vibration free, permit the vehicle to be jacked by the bumper, and should be self-restoring after low speed impact. The present invention provides such a vibration-free energy absorbing mechanism that is relatively light weight, can withstand repeated impact, is self-restoring, permits jacking of the vehicle by the bumper, is reliable, durable, and of rather simple design.

SUMMARY OF THE INVENTION

According to this invention there is provided an energy absorbing mechanism comprising, in combination, an elongated member, one end of which is disposed to receive an impact wherein the opposite end is free for displacement under said impact, said elongated member being provided with two longitudinally spaced transverse pins and a pair of longitudinal slots within which the pin adjacent said outboard end of the elongated member is free to slide, whereas said other transverse pin is fixed to the inboard end of said elongated member, an oriented elastomer operably connecting said pins so as to constitute an energy absorber on displacement of said elongated member responsive to impact.

The oriented elastomer can be in the form of a solid strip of material provided with loops for connecting the ends of the strip to each pin. However, preferably the oriented elastomer is in the form of a belt positioned around said pins, and most preferably, a lapped belt. A lapped belt can be fabricated conveniently by making multiple windings of a tape of oriented elastomer around said pins and securing the belt from unwinding by suitable means, e.g., clamps, band, or other fasteners. Preferably, this is accomplished by wrapping a band of a lower melting point heat-shrinkable polymer around a portion of the lapped belt and heat shrinking the band. The number of windings will depend upon the weight of the belt needed for a particular energy absorbing capacity as described below. Preferably, the elastomer used as the energy absorber is an oriented copolyether-ester usually in the form of a belt.

Although the energy absorbing mechanism of the present invention finds wide use for many applications, it will hereinafter be described in relation to its principal field of application and utility, namely, its use on automotive vehicles. The energy absorbing mechanism is mounted on the frame of the vehicle by means of a slip or collar flange encircling the elongated member. Usually, a bumper or impact bar is mounted on the outboard ends of two energy absorbing mechanisms that are mounted on the extended rail ends of a car frame.

BRIEF DESCRIPTION OF DRAWING

FIG. 1 is a side elevation, partially cut away, of an energy absorbing mechanism showing its attachment to the frame of a car;

FIG. 2 is a sectional view of the mechanism taken along line 2—2 of FIG. 1; and

DETAILED DESCRIPTION OF THE INVENTION

Figure 3:
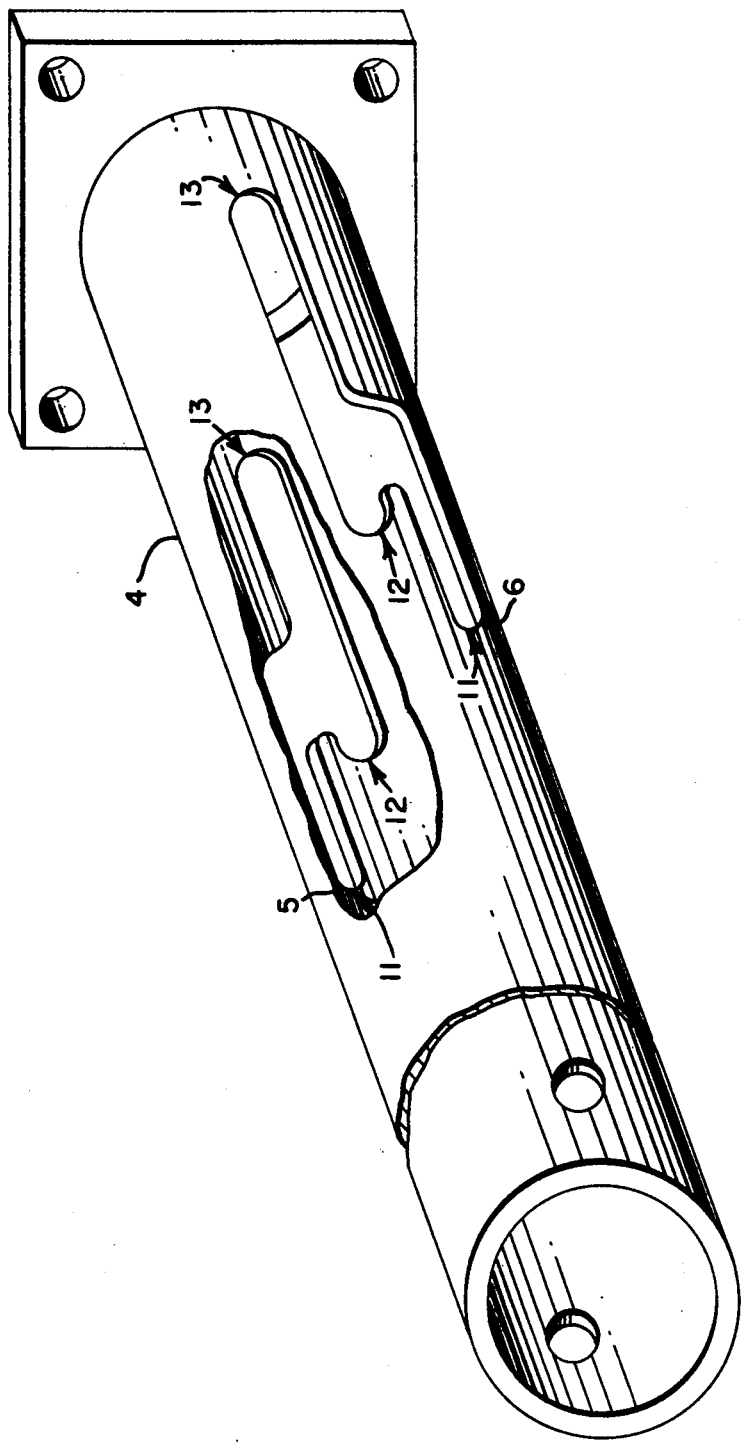
FIG. 3 is a perspective view, partially cut away, of a part of the mechanism showing the positions of the pair of slots.

Referring now to the drawing, in FIG. 1 the energy absorbing mechanism, indicated generally at 1, is shown mounted on a frame member 2 of a vehicle, e.g., an automobile. The energy absorbing mechanism includes an elongated member 4 that serves as a mount for a bumper or impact bar 3. Elongated member 4 is provided with a pair of longitudinal slots 5 and 6. Elongated member 4, usually a hollow cylinder made of steel, contains two hardened steel longitudinally spaced transverse pins 7 and 8. Pin 7 is located adjacent the forward or outboard end of member 4 and is free to slide in longitudinal slots 5 and 6. Pin 8 is fixed at the back or inboard end of member 4. A lapped belt 9 of oriented copolyetherester elastomer within elongated member 4 is positioned around transverse pins 7 and 8 and is stretched when in operative condition to place the elastomer under tension. A band 14 that is a lower melting point heatshrinkable elastomer fits around belt 9 to prevent it from unwinding. A collar flange 10 fits around pin 7 located at the outboard end of member 4. Member 4 is provided with a bumper 3. The energy absorbing mechanism is mounted to frame member 2 of a vehicle by means of collar flange 10. Pins 7 and 8 are held by interference fit within holes in collar flange 10 and elongated member 4, respectively, and can be removed therefrom to facilitate mounting of the belt 9 within said elongated member.

Referring to FIGS. 1 and 3, slots 5 and 6 preferably are of bayonet shape and are so oriented that the pair is rotationally symmetrical about the longitudinal axis of elongated member 4. Each slot has three extreme positions, 11, 12 and 13. Slots of said preferred shape permit the belt to be mounted easily on the pins in the unstressed state and stressed subsequently by movement of pin 7 to another position within the slot as described below.

The energy absorber or belt 9 is an oriented elastomer and preferably an oriented copolyetherester elastomer. The copolyetherester elastomer used to form the belt consists essentially of a multiplicity of recurring long-chain and short-chain ester units joined head-to-tail through ester linkages, said long-chain ester units being represented by the structure:

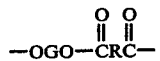

and said short-chain ester units being represented by the structure:

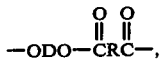

wherein:

G is a divalent radical remaining after removal of terminal hydroxyl groups from poly(alkylene oxide) glycols having a molecular weight between about 400–6000, e.g., poly(tetramethylene oxide) glycol;

R is a divalent radical remaining after removal of carboxyl groups from a dicarboxylic acid having a molecular weight less than about 300, e.g., phthalic, terephthalic or isophthalic acids; and D is a divalent radical remaining after removal of hydroxyl groups from a low molecular weight diol having a molecular weight less than about 250; said short-chain ester units constitute about 15–95% by weight of the copolyetherester and said long-chain ester units constitute the balance.

The copolyetheresters can be made conveniently by a conventional ester interchange reaction. A preferred procedure involves heating the dicarboxylic acid, e.g., dimethyl ester of terephthalic acid, phthalic or isophthalic acid, with a long-chain glycol, e.g., poly(tetramethylene oxide) glycol having a molecular weight of about 600–2000 and a molar excess of diol, e.g., 1,4-butanediol, in the presence of a catalyst at about 150°–260° C. and a pressure of 0.5 to 5 atmospheres, preferably ambient pressure, while distilling off methanol formed by the ester interchange. Thus, preferably, in the above formula G is the group remaining after removal of hydroxyl groups from poly(tetramethylene oxide) glycol having a molecular weight of about 600–2000; R is the group remaining after removal of carboxyl groups from phthalic, terephthalic or isophthalic acids or mixtures thereof, and D is the group remaining after removal of hydroxyl groups from 1,4-butanediol. At least about 1.1 mole of diol should be present for each mole of acid, preferably at least about 1.25 mole of diol for each mole of acid. The long-chain glycol should be present in the amount of about 0.0025 to 0.85 mole per mole of dicarboxylic acid, preferably 0.01 to 0.6 mole per mole of acid.

Preferred copolyesters are those prepared from dimethyl terephthalate, 1,4-butanediol, and poly(tetramethylene oxide) glycol having a molecular weight of about 600–2000 or poly(ethylene oxide) glycol having a molecular weight of about 600–1500. Optionally, up to about 30 mole percent and preferably 5–20 mole percent of the dimethyl terephthalate in these polymers can be replaced by dimethyl phthalate or dimethyl isophthalate. Other preferred copolyesters are those prepared from dimethyl terephthalate, 1,4-butanediol, and poly(propylene oxide) glycol having a molecular weight of about 600–1600. Up to 30 mole percent and preferably 10–25 mole percent of the dimethyl terephthalate can be replaced with dimethyl isophthalate or butanediol can be replaced with neopentyl glycol until up to about 30% and preferably 10–25% of the short-chain ester units are derived from neopentyl glycol in these poly(propylene oxide glycol polymers.

The copolyetherester compositions may also contain up to about 5 weight percent of an antioxidant, e.g., between about 0.2 and 5 weight percent, preferably between about 0.5 and 3 weight percent. The most preferred antioxidants are diaryl amines such as 4,4'-bis-($\alpha$,$\alpha$-dimethylbenzyl) diphenylamine.

The most preferred copolyetherester compositions may also contain up to about 5 weight percent of an antioxidant, e.g., between about 0.2 and 5 weight percent, preferably between about 0.5 and 3 weight percent. The most preferred antioxidants are diaryl amines such as 4,4'-bis($\alpha$,$\alpha$-dimethylbenzyl) diphenylamine.

Belts of the oriented copolyetherester can be formed in a number of ways. For example, a billet can be molded from the polymer in a conventional manner and the billet oriented by stretching, heat setting, and cooling. The copolyetherester belt is oriented by stretching the copolyetherester by conventional means at least 300% of its original length and preferably at least 400% at a temperature below its melting point by at least 20° F. It is maintained at that length and brought to or maintained at a heat setting temperature between 150° and 20° F. below its melting point. It is then cooled to a temperature below the heat setting temperature by at least 100° F.

The copolyetheresters are further described in Witsiepe, U.S. Pat. No. 3,766,146, and the oriented copolyetheresters are described in Brown and McCormack, Ser. No. 542,257, filed Jan. 20, 1975, the disclosures of which are incorporated herein by reference.

In operation the mechanism functions in the following manner. Belt 9 is put in place within elongated member 4 with pin 7 resting within slots 5 and 6 at position 11. The belt is not stressed with pin 7 so positioned. To prepare the shock absorbing mechanism for operation belt 9 is prestressed by moving pin 7 longitudinally within slots 5 and 6 from position 11 until it rests in position 12. This movement of pin 7 stretches belt 9 and places it under tensile stress, as shown in FIG. 1. The belt is of such length that said movement causes the desired degree of prestressing, the force level of which prevents road vibration of the bumper and provides high initial impact force for greater energy absorption. Impact upon bumper 3 causes elongated member 4 to move in a direction toward its inboard end relative to pin 7 which is held in a fixed position with respect to vehicle frame 2 by collar flange 10. Collar flange 10 also supports and guides the bumper motion and provides support for jacking the vehicle. The length of slots 5 and 6 between positions 12 and 13 permits movement of elongated member 4 relative to pin 7. Said movement of member 4 causes further tensioning and stretching of belt 9 whereby the energy of impact is absorbed and the movement of the bumper is cushioned. Some of the energy absorbed is reversibly stored in the belt and is used to return the energy-absorbing device to its original position and the remainder of the energy is dissipated. Thus, after the impact is so dissipated, elongated member 4 and bumper 3 return to their original positions as a consequence of the elastic nature of belt 9 with pin 7 again resting in a prestressed position at 12, and the energy absorbing mechanism is immediately ready to function again, when needed, in the manner described above.

Dimensions of the belt of oriented elastomer and the distances between the extreme positions of the bayonet shaped slots 5 and 6 will depend upon the amount of energy required to be absorbed by the shock absorbing mechanism and the desired rate of absorption. Factors which increase the energy absorbing capacity are: (1) enlarging the cross-sectional area of the belt, (2) increasing the potential displacement of the bumper by lengthening the distance between positions 12 and 13, and hence, increasing the ultimate stretch and stress level of the extended belt, and (3) increasing the degree of prestressing of the belt by increasing the distance between positions 11 and 12 for a given belt length. Selecting a higher modulus elastomer for fabrication of the belt is another factor that can be used to increase energy absorbing capacity. For bumpers of cars of varying weights the above specifications will vary because of varying energy absorption requirements and varying limitations on maximum force and maximum deflection. On the average a belt when made of the preferred oriented copolyetherester elastomer, as referred to above, will measure about 12.7–25.4 cm in length and weigh about 75–300 g, and the length of slots 5 and 6 between positions 11 and 12 will be sufficient to permit the belt to be prestressed by stretching it 5–25% of its original length. Distance between positions 12 and 13 of slots 5 and 6 is usually selected so that the permitted bumper displacement can cause a maximum stretching of the belt of 15 to 60% relative to its original length in the unprestressed state.

We claim:

1. An article of manufacture suitable for use in cushioning impact comprising an oriented copolyetherester elastomer in the form of a belt having multiple windings and being capable of absorbing energy when stretched under tension upon force of impact, said oriented copolyetherester elastomer consisting essentially of a multiplicity of recurring long-chain and short-chain ester units joined head-to-tail through ester linkages, said long-chain ester units being represented by the structure:

and said short-chain ester units being represented by the structure:

wherein:
G is a divalent radical remaining after removal of terminal hydroxyl groups from poly(alkylene oxide) glycols having a molecular weight between about 400–6000;
R is a divalent radical remaining after removal of carboxyl groups from a dicarboxylic acid having a molecular weight less than about 300; and
D is a divalent radical remaining after removal of hydroxyl groups from a low molecular weight diol having a molecular weight less than about 250;
said short-chain ester units constitute about 15–95% by weight of the copolyetherester.

2. An article of claim 1 wherein the belt is secured by a band of heat-shrinkable elastomer.

3. An article of claim 1 wherein G is the group remaining after removal of hydroxyl groups from poly(tetramethylene oxide) glycol having a molecular weight of about 600–2000; R is the group remaining after removal of carboxyl groups from phthalic, terephthalic or isophthalic acids or mixtures thereof; and D is the group remaining after removal of hydroxyl groups from 1,4-butanediol.

* * * * *